United States Patent
Ray et al.

(10) Patent No.: US 9,774,103 B2
(45) Date of Patent: Sep. 26, 2017

(54) RADIAL TERMINATION SYSTEM FOR A COMMUNICATION CONNECTOR

(71) Applicant: Optical Cable Corporation, Roanoke, VA (US)

(72) Inventors: John Michael Ray, Asheville, NC (US); Sumio Seo, Wallingford, VT (US); Nicholas Uhland, Asheville, NC (US); Derrick F. Stikeleather, Swannanoa, NC (US); Ian J. Timmins, Asheville, NC (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 15/407,994

(22) Filed: Jan. 17, 2017

(65) Prior Publication Data

US 2017/0207551 A1    Jul. 20, 2017

Related U.S. Application Data

(60) Provisional application No. 62/279,180, filed on Jan. 15, 2016.

(51) Int. Cl.
*H01R 4/24* (2006.01)
*H02G 15/06* (2006.01)
*H01R 13/506* (2006.01)

(52) U.S. Cl.
CPC ......... *H01R 4/2433* (2013.01); *H01R 13/506* (2013.01); *H02G 15/06* (2013.01)

(58) Field of Classification Search
CPC .... H01R 4/2433; H01R 13/506; H01R 13/64; H01R 13/56
USPC .......................................... 439/668, 469, 404
See application file for complete search history.

(56) References Cited

U.S. PATENT DOCUMENTS

| | | | | |
|---|---|---|---|---|
| 7,635,285 | B2* | 12/2009 | Carroll | H01R 4/2429 439/344 |
| 9,184,534 | B1* | 11/2015 | Errato, Jr. | H01R 13/5845 |
| 2005/0287873 | A1* | 12/2005 | Carroll | H01R 13/6463 439/676 |
| 2006/0141835 | A1* | 6/2006 | Weyl | H01B 7/02 439/210 |
| 2006/0160407 | A1* | 7/2006 | Carroll | H01R 13/6467 439/418 |

(Continued)

*Primary Examiner* — Alexander Gilman
(74) *Attorney, Agent, or Firm* — The Van Winkle Law Firm; William G. Heedy; David M. Carter (57) ABSTRACT

A system for radially terminating cabling includes a stuffer cap component surrounding an opening sized and configured for selective passage therethrough of a plurality of conductor pairs; a plurality of slots concentrically arranged on the front end of the stuffer cap component, wherein each wire of each of the plurality of conductor pairs may be selectively pressed into one of the plurality of slots; at least one keying member on the stuffer cap component having a unique keying member geometry; a connector including a receptacle component configured for mating with the stuffer cap component, wherein at least one keying element on the receptacle component is geometrically sized and configured for passage therethrough of a corresponding one of the keying members; a plurality of IDCs each being aligned for engaged abutment with a corresponding one of the wires of the plurality of conductor pairs when the stuffer cap component is axially rotated by a user.

15 Claims, 8 Drawing Sheets

(56) References Cited

U.S. PATENT DOCUMENTS

| | | | | |
|---|---|---|---|---|
| 2006/0205251 A1* | 9/2006 | Gaidosch | ............... | H01R 9/031 439/95 |
| 2008/0268719 A1* | 10/2008 | Siemon | .............. | H01R 13/6463 439/719 |
| 2009/0258544 A1* | 10/2009 | Allwood | ................ | H01R 4/242 439/668 |
| 2009/0318033 A1* | 12/2009 | Tobey | ................ | H01R 13/5837 439/676 |
| 2011/0028026 A1* | 2/2011 | Lu | ........................ | H01R 4/2433 439/404 |
| 2011/0108306 A1* | 5/2011 | Parham, Jr. | ............ | H01R 24/64 174/81 |
| 2011/0201236 A1* | 8/2011 | Murray | ................ | H01R 4/2433 439/668 |
| 2012/0045175 A1* | 2/2012 | Ordo | .................... | H01R 13/506 385/55 |
| 2015/0102803 A1* | 4/2015 | Young | ................... | G01R 15/18 324/127 |
| 2015/0364859 A1* | 12/2015 | Maranto | ............ | H01R 13/5812 439/469 |
| 2016/0240986 A1* | 8/2016 | Bragg | .................... | H01R 24/64 |

* cited by examiner

RADIAL TERMINATION SYSTEM FOR A COMMUNICATION CONNECTOR

RELATED APPLICATION

This application claims priority to and incorporates entirely by reference U.S. Provisional Patent Application Ser. No. 62/279,182 filed on Jan. 15, 2016.

FIELD OF THE INVENTION

This invention relates to termination of electrical connectors and, more particularly, a system for managing cable pairs and facilitating radial termination of cables to the connector housing.

BACKGROUND OF THE INVENTION

Termination of an electrical connector for copper data communications in the structured cabling field requires a reliable and repeatable process that can be accomplished in a rapid fashion.

In view of the foregoing, there exists a need for a system for accomplishing termination of many different styles and categories of four pair twisted pair data cable to Insulation Displacing Contacts (IDCs) which is accomplished by rotational movement of a stuffer cap relative to the electrical connector.

SUMMARY OF THE INVENTION

In accordance with one form of this invention, there is provided a system for radially terminating cabling, the system including a stuffer cap component having a front end and a rear end, the stuffer cap component surrounding an opening sized and configured for selective passage therethrough of a plurality of conductor pairs of the cabling through the rear end of the stuffer cap component; a plurality of slots concentrically arranged on the front end of the stuffer cap component, wherein each wire of each of the plurality of conductor pairs may be selectively pressed into one of the plurality of slots; at least one keying member on the stuffer cap component, the at least one keying member having a unique keying member geometry; a connector including a receptacle component having a back end configured for mating with the front end of the stuffer cap component, wherein at least one keying element on the receptacle component is geometrically sized and configured for aligned passage therethrough of a corresponding one of the at least one keying members; a plurality of insulation displacement contacts (IDCs) on the inner facing surface of the receptacle component being positioned adjacent and concentrically perpendicular to the back end of the receptacle component; and each of the plurality of IDCs being aligned for engaged abutment with a corresponding one of the wires of the plurality of conductor pairs when the stuffer cap component is axially rotated by a user.

In accordance with another form of this invention, there is provided a system for radially terminating cabling, the system including a stuffer cap component having a front end surface, the stuffer cap component surrounding an opening sized and configured for selective passage therethrough of a plurality of conductor pairs of the cabling; a plurality of slots being arranged concentrically perpendicular to the front end surface of the stuffer cap component, wherein each wire of each of the plurality of conductor pairs may be selectively pressed into a corresponding one of the plurality of slots; at least one stuffer key protrusion on the stuffer cap component, the at least one stuffer key protrusion having a unique keying member geometry; a communication connector including a receptacle component having a back end surface configured for mating with the front end of the stuffer cap component, wherein at least one IDC surround slot on the receptacle component is geometrically sized and configured for aligned passage therethrough of a corresponding one of the at least one stuffer key protrusions; a plurality of insulation displacement contacts (IDCs) on the receptacle component being positioned adjacent and concentrically perpendicular to the back end surface of the receptacle component; and each of the plurality of IDCs being aligned for engaged abutment with a corresponding one of the wires of the plurality of conductor pairs when the stuffer cap component is axially rotated by a user.

BRIEF DESCRIPTION OF THE DRAWINGS

The subject matter which is regarded as the invention is set forth in the appended claims. The invention itself together with further objects and advantages may be better understood in reference to the following description taken in conjunction with the accompanying drawings in which:

Like reference numerals refer to like parts throughout the several views of the drawings.

DESCRIPTION OF THE PREFERRED EMBODIMENTS

Referring to the several views of the drawings, the radial termination system for a communication connector of the present invention is shown and is generally indicated as 10.

Figure 1:
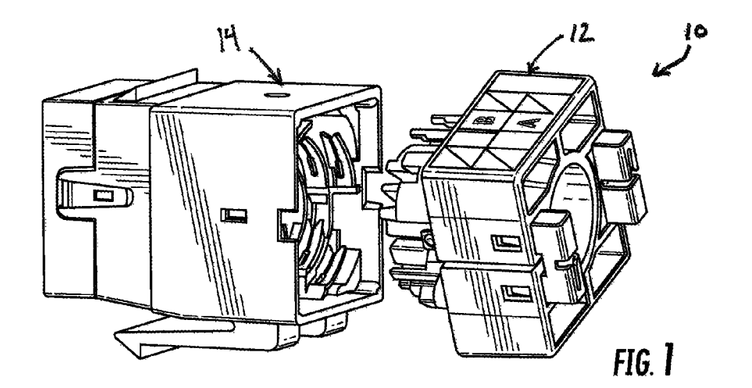
FIG. 1 is a perspective view of the radial termination system in accordance with one embodiment.
Figure 2:
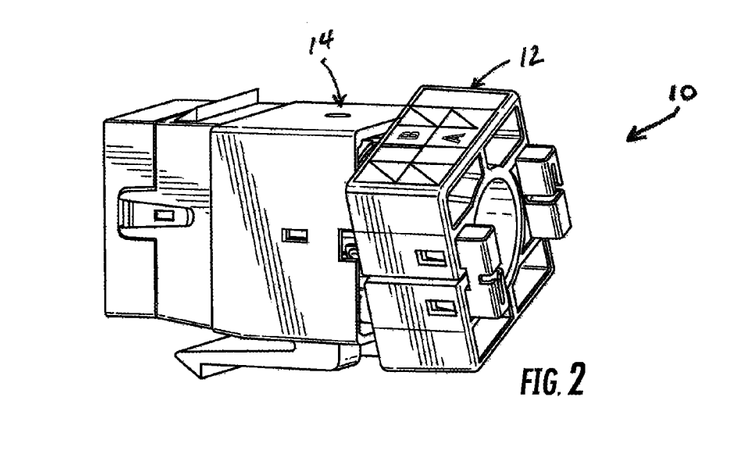
FIG. 2 is a perspective view of the radial termination system thereof.
Figure 3:
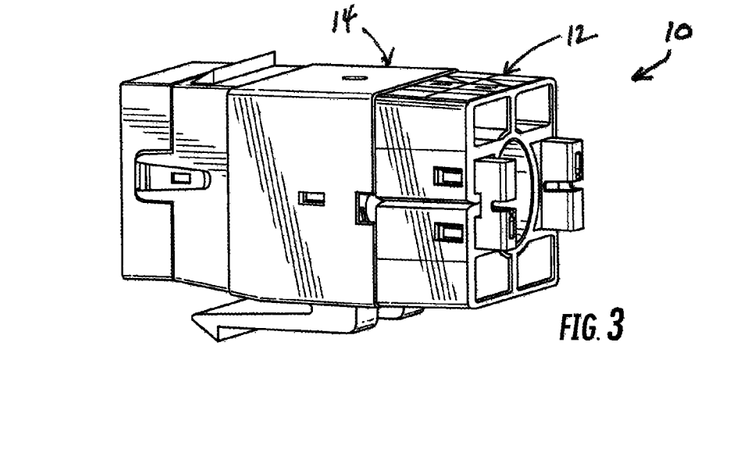
FIG. 3 is a perspective view of the radial termination system thereof.

Referring initially to FIGS. 1-3, a first embodiment of the radial termination system 10 generally includes a stuffer cap component 12 and a communication connector 14. While the communication connector 14 illustrated throughout the drawings is a jack connector component, the radial termination system 10 of the present invention is equally applicable to a plug connector component.

Figure 4:
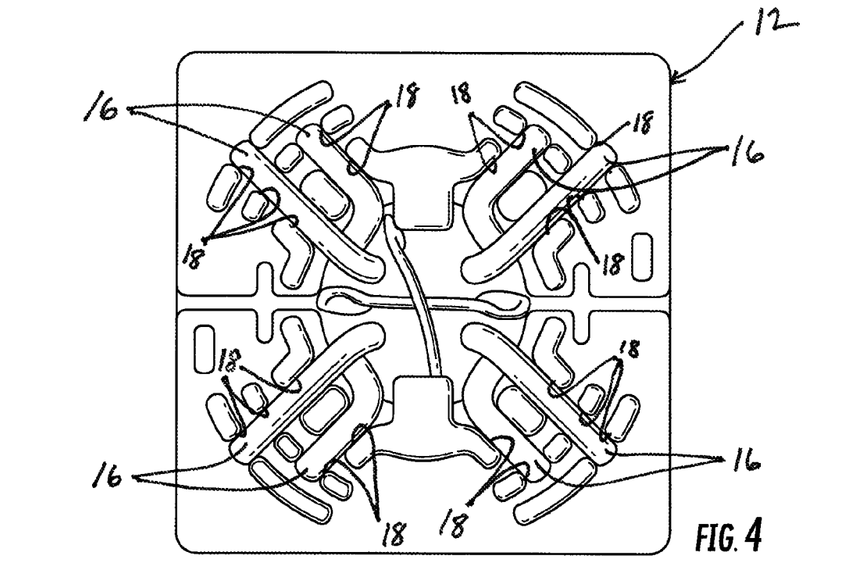
FIG. 4 is an isolated front elevational view of the stuffer cap component with wires from cabling pressed into position in the wire slots of the stuffer cap.

Referring particularly to FIG. 4, the stuffer cap component 12 includes a front end and a rear end having an opening sized and configured for selective passage therethrough of a plurality of conductor pairs, including individual wires 16, of the cabling. A plurality of slots 18 are concentrically arranged on the front end of the stuffer cap component 12 are sized for selective pressed receipt of each wire 16 of each of the plurality of conductor pairs. More specifically, a user may prepare the cable for termination by stripping the cable jacket at a certain length to expose the twisted pairs of wires 16 and subsequently press the individual wires 16 down into the slot 18. The wires 16 are then trimmed flush with the edge of each corresponding slot 18.

Figure 5:
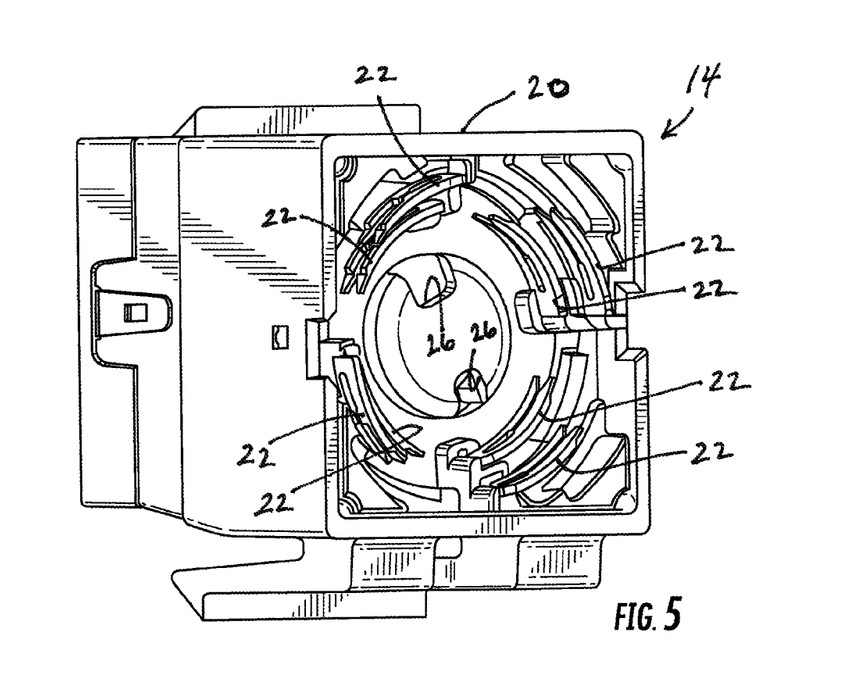
FIG. 5 is a perspective view of the communication connector.

Referring particularly to FIG. 5, the communication connector 14 includes a receptacle component 20 having a back end configured for mating with the front end of the stuffer cap component 12. A plurality of insulation displacement contacts (IDCs) 22 on the inner facing surface of the receptacle component 20 are positioned adjacent and concentrically perpendicular to the back end of the receptacle component 20. Each of the plurality of IDCs 22 are aligned for engaged abutment with a corresponding one of the wires 16 of the plurality of conductor pairs when the stuffer cap component 12 and communication connector 14 are in the locked position (see FIGS. 9 and 10).

The stuffer cap component 12 includes at least one keying member 24 having a unique keying member geometry. In one embodiment, stuffer cap components 12 include a plurality of unique keying geometries. For example, the stuffer cap component 12 illustrated in FIGS. 1-10 includes two keying members 24, each having different keying geometries. The receptacle component 20 includes at least one keying element 26 which is geometrically sized and configured for aligned passage therethrough of a corresponding one of the at least one keying members 24.

Figure 6:
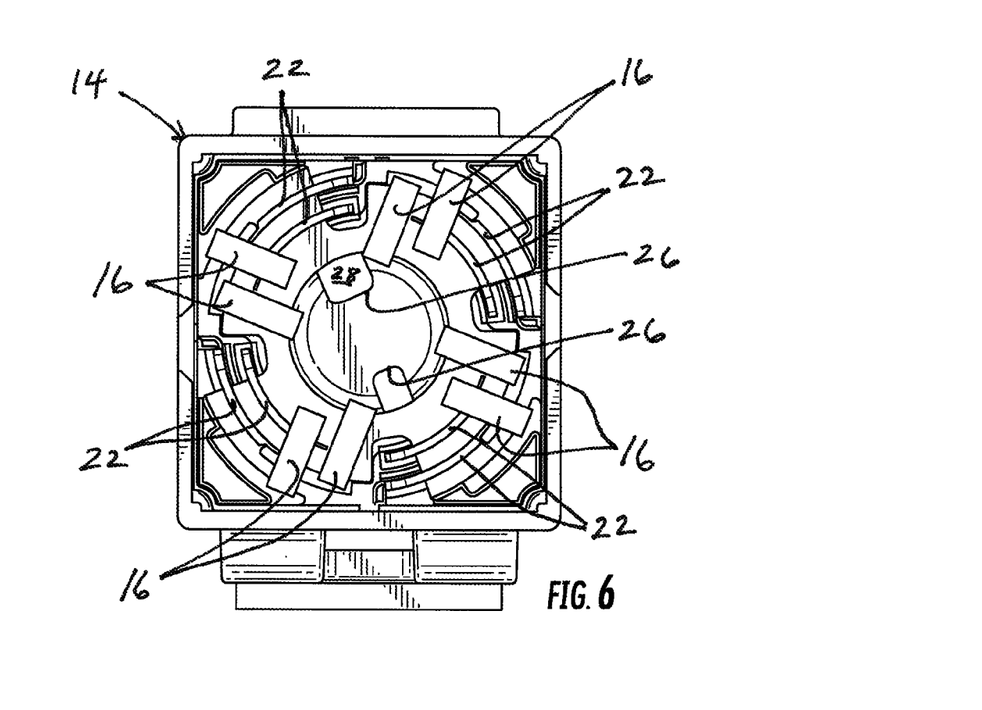
FIG. 6 is a front elevational view of the communication connector.
Figure 7:
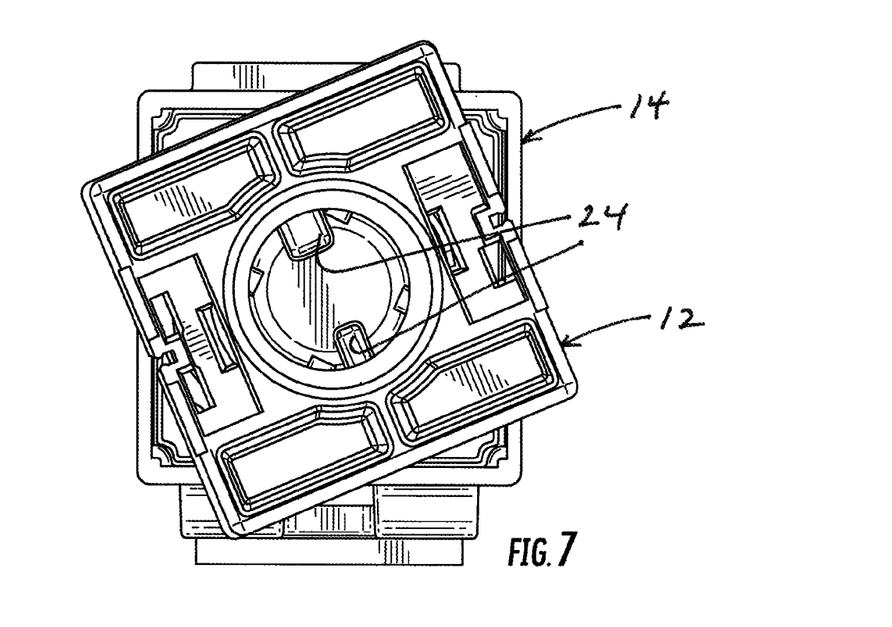
FIG. 7 is a front elevational view of the stuffer cap component and communication connector in keyed alignment.

Referring to FIGS. 6-10, the radial termination process is illustrated. Referring specifically to FIGS. 6 and 7, the stuffer cap component 12 is shown with an orientation slightly to the left in the counter-clockwise direction (approximately 22.5 degrees), allowing the two keying members 24 to be in alignment with the two corresponding keying elements 26. The associated cabling of the wires 16 is not shown throughout the illustrations for the purposes of clarity. Referring specifically to FIG. 6, wherein only a portion of the wires 16 are shown (the stuffer cap component is otherwise not illustrated for the purposes of clarity), each wire 16 is shown adjacent to the corresponding IDC 22. The PCB 28, in connection with IDCs 22, can be viewed in part through the openings formed by the keying elements 26. Referring specifically to FIG. 7, the two keying members 24 are shown in alignment with the two corresponding keying elements 26.

Figure 8:
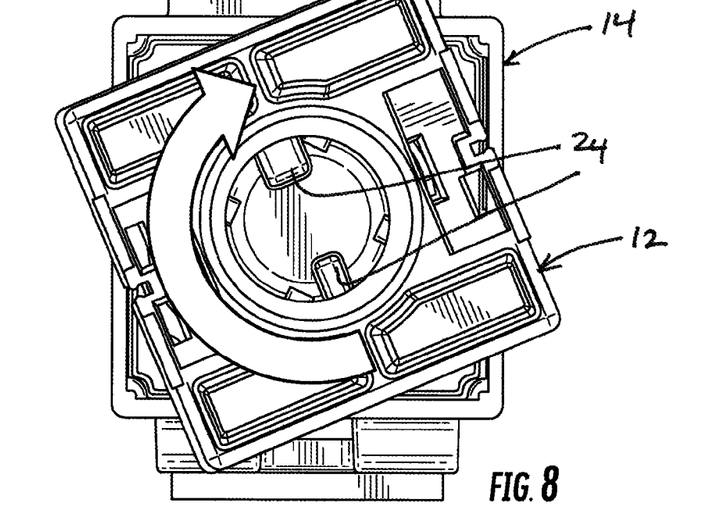
FIG. 8 is a front elevational view of the rotational movement required to lock the stuffer cap component and communication connector when in keyed alignment.
Figure 9:
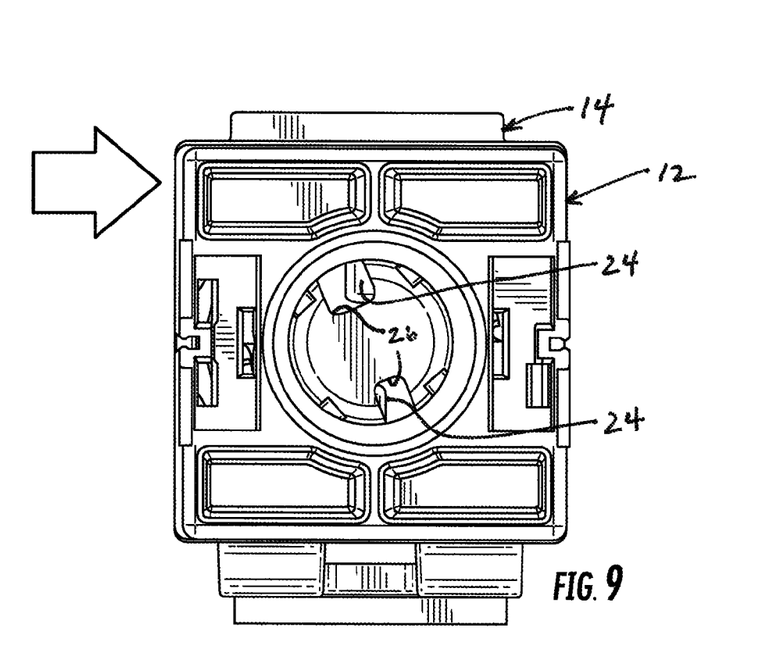
FIG. 9 is a front elevational view of the stuffer cap component and communication connector in locked position.
Figure 10:
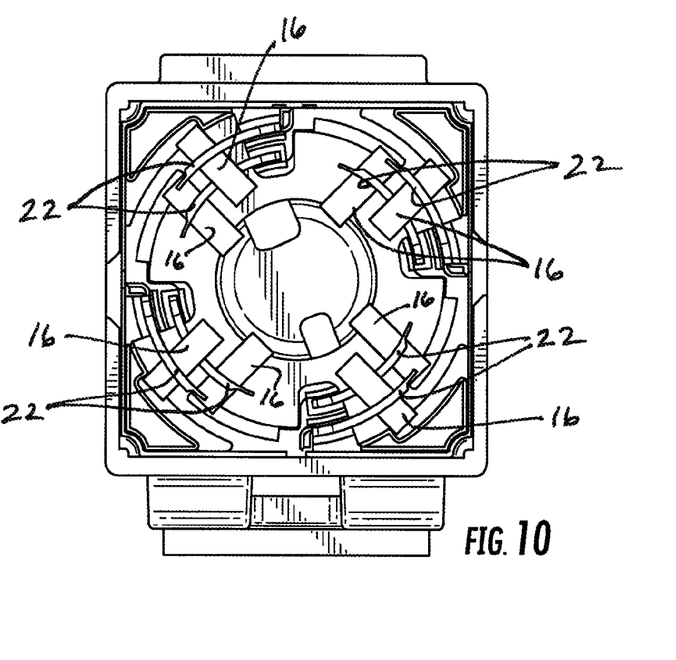
FIG. 10 is an isolated front elevational view showing each of the IDCs in engaged abutment with a corresponding one of the wires.
Figure 11:
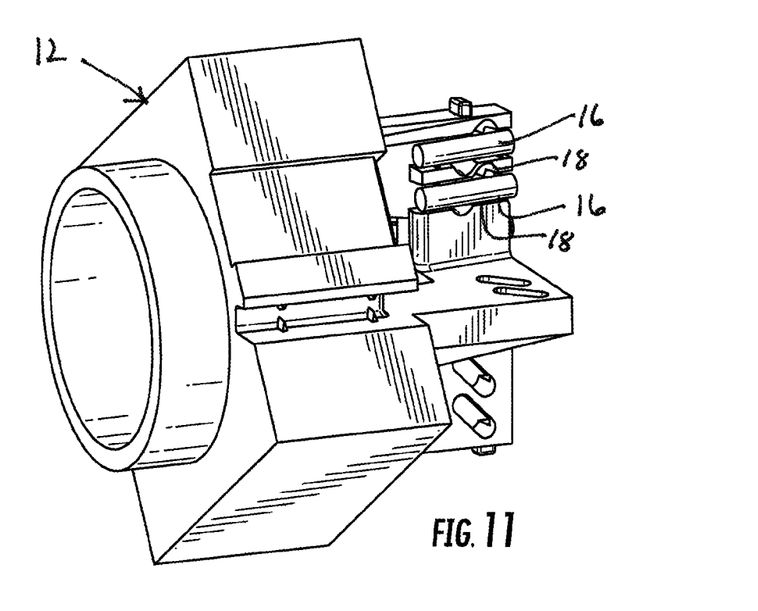
FIG. 11 is a perspective view of the stuffer cap component in accordance with another embodiment.
Figure 12A:
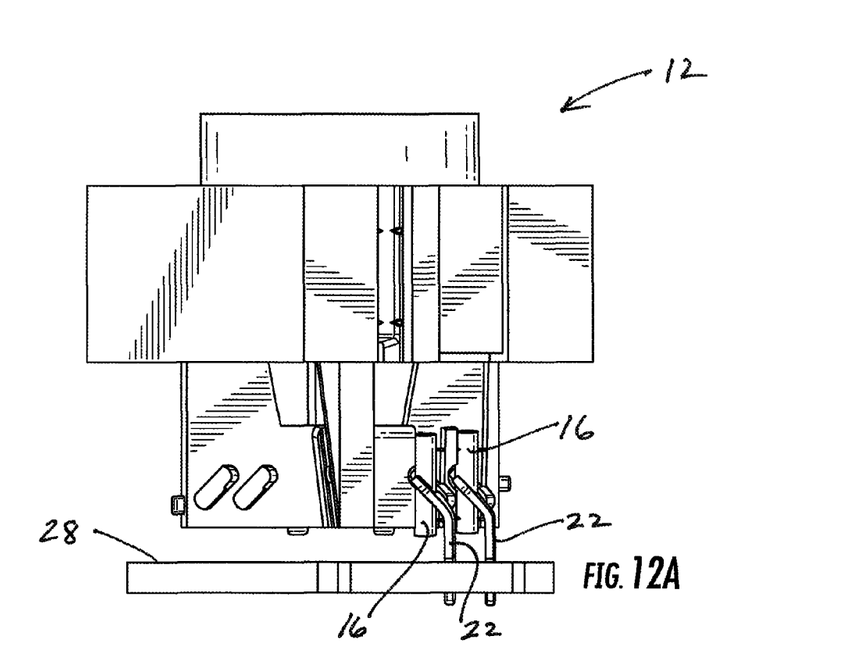
FIG. 12A is a right side elevational view of the stuffer cap component showing two of the IDCs in engaged abutment with a corresponding one of the wires.
Figure 12B:
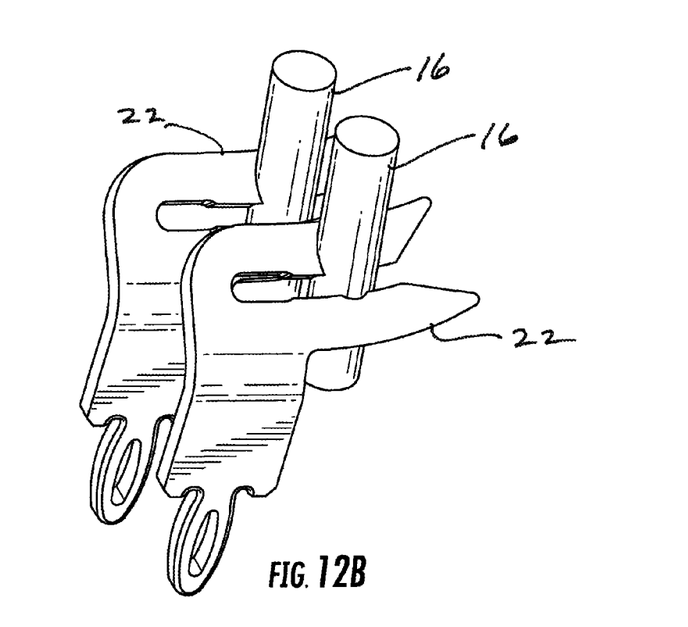
FIG. 12B is an isolated view of two of the IDCs in engaged abutment with a corresponding one of the wires.

Referring to FIGS. 8-10, after the two keying members 24 have passed through the two corresponding keying elements 26, the stuffer cap component 12 is axially rotated by a user in the clockwise direction relative to the receptacle component 20 until the wires 16 are terminated into the respective IDCs 22 (see FIGS. 9 and 10). The keying features further serve as a locking mechanism for maintaining the stuffer cap component 12 and communication connector 14 in the locked position. As shown throughout the drawings, the body of each of the IDCs 22 may be concentrically curved such that the concave surface of each IDC 22 is inwardly facing to facilitate radial termination.

Referring to FIGS. 11-14, another embodiment of the stuffer cap 12 is shown, wherein the wires 16 in slots 18 are terminated in a generally perpendicular orientation to the PCB 28. As shown in FIGS. 12A and 12B, the distal ends of the IDCs 22 are angled inwards toward the center of the communication connector 14 at approximately a 45-degree angle. Moreover, the IDCs 22 include a curvature of the split within the contact to enable the wires 16 to travel radially as termination occurs.

Figure 13:
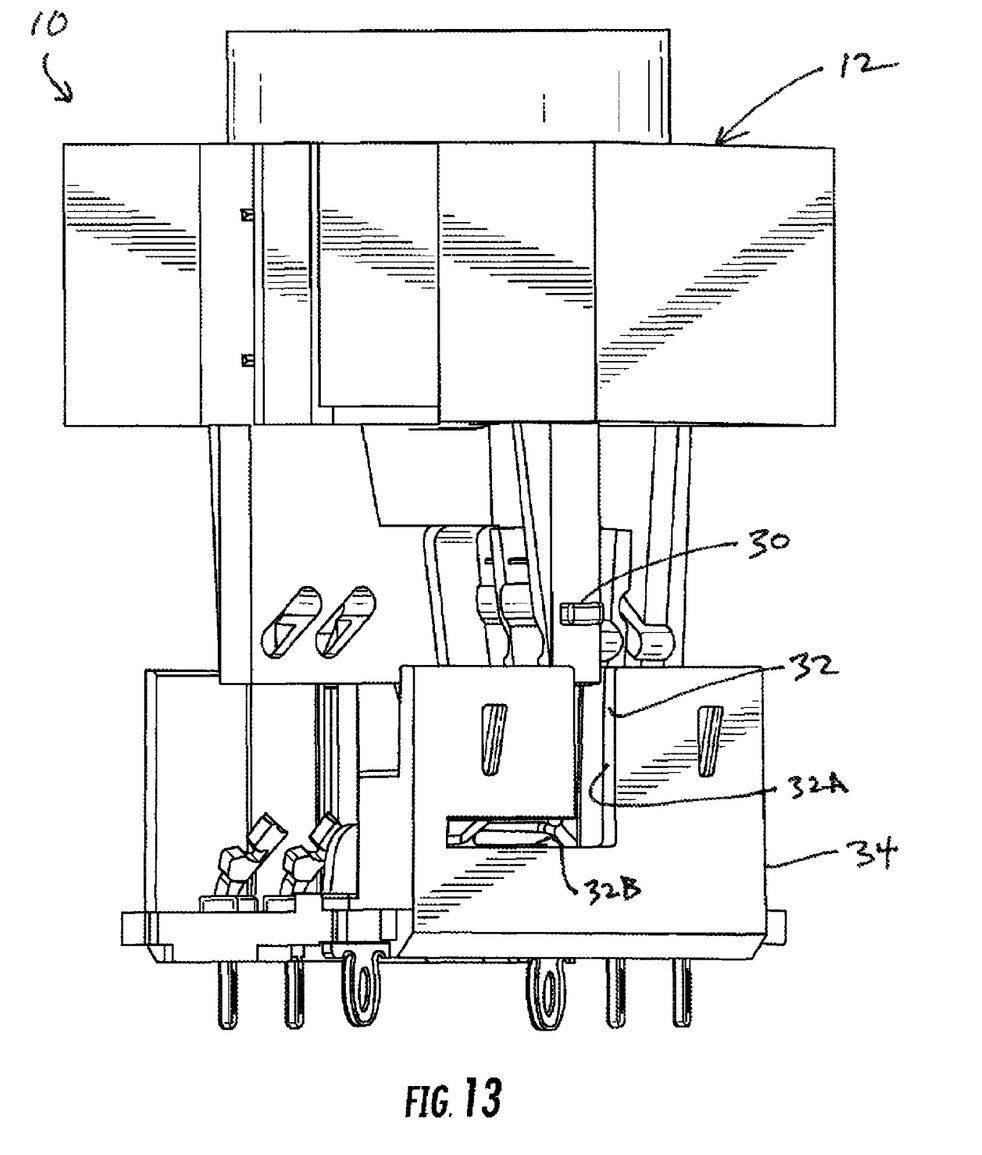
FIG. 13 is a perspective view of the stuffer cap component and communication connector in keyed alignment.
Figure 14:
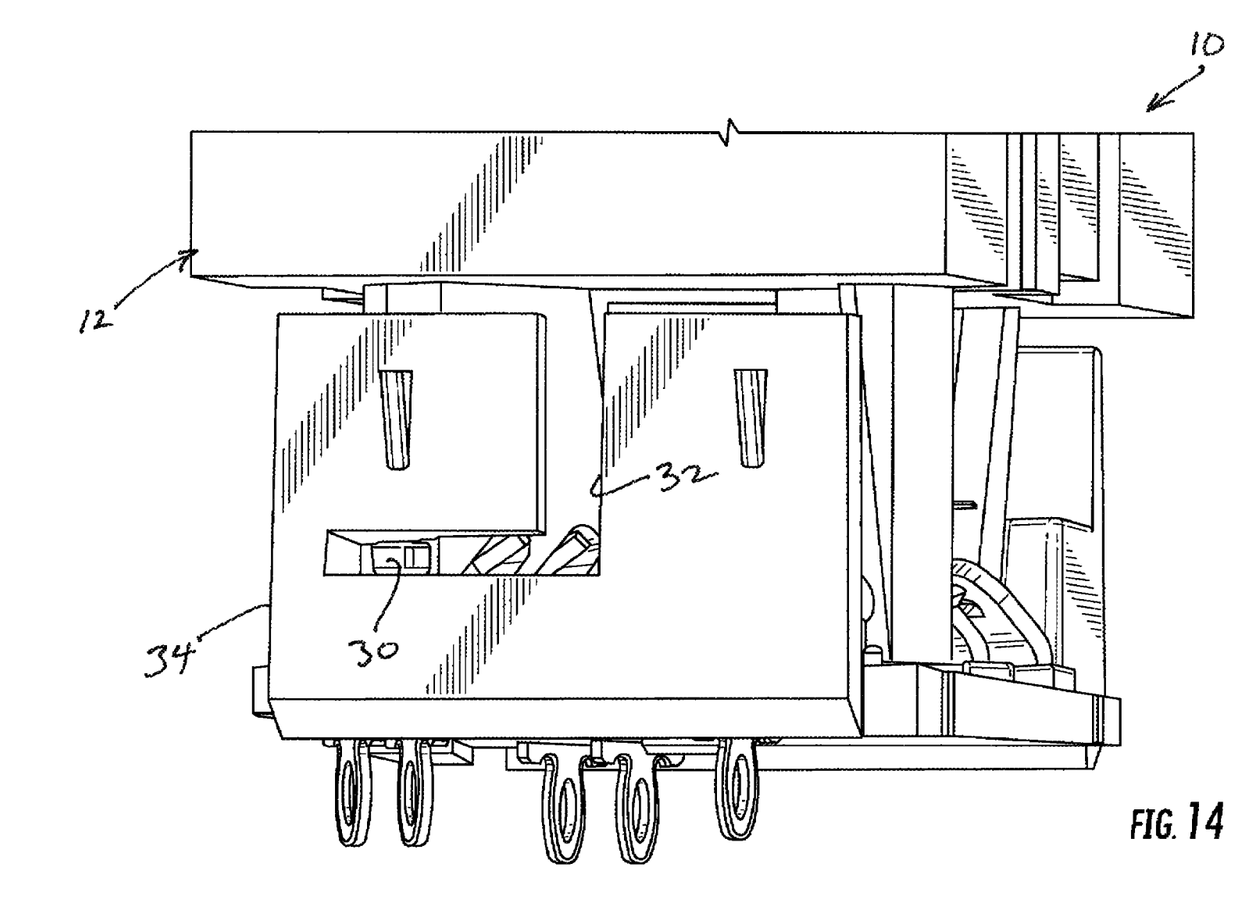
FIG. 14 is a perspective view of the stuffer cap component and communication connector in locked position.

Specifically referring to FIGS. 13 and 14, a stuffer key protrusion 30 is sized for fitted passage through an IDC surround slot 32 formed on the IDC surround housing 34 of the communication connector 14. As shown, the IDC surround slot 32 is L-shaped, such that two movements are required as part of the keying mechanism for this particular embodiment-(1) the stuffer cap component 12 is pressed toward the IDC surround housing 34 along the path of the first portion 32A of the IDC surround slot 32 and (2) the stuffer cap component 12 is rotated along the path of the second portion 32B of the IDC surround slot 32 to terminate the wires 16 and lock the stuffer cap component 12 with the communication connector 14.

While the orientation of the stuffer caps 12, IDCs 22, and keying features thus far presented have been shown and described as necessitating clockwise rotation for termination, it should be understood that counterclockwise rotation is equally practical from a structural standpoint.

Generally, two styles of communication connectors 14 may be provided-(1) an unshielded connector using standard polycarbonate type materials and lacking an internal shield connection and (2) a shielded connector utilizing conductive plastics or metallic die cast parts. The latter instance of the connector would include a shield connection to complete the continuity between a shielded plug and the shield of the cable. If the cable is shielded, the drain wire may be pushed through the far end of the stuffer cap component 12 to also be laced into a wire slot designed specifically for that purpose. If the shielded cable has an overall braid, the braid is pushed back over the cable jacket before the wires 16 are inserted into the stuffer cap component 12. The braid is later prepared by twisting and terminated to the clips provided for this purpose.

A combination of conductive plastic and cast metallic parts with an internal conductive bridge provide for both shielded and unshielded embodiments by substitution of standard plastic materials and population or no population of the conductive bridge between the front and back of the connector.

While the present invention has been shown and described in accordance with several preferred and practical embodiments, it is recognized that departures from the instant disclosure are contemplated within the spirit and scope of the present invention.

What is claimed is:

1. A system for radially terminating cabling, said system comprising:
   a stuffer cap component having a front end and a rear end, said stuffer cap component surrounding an opening sized and configured for selective passage therethrough of a plurality of conductor pairs of the cabling through the rear end of said stuffer cap component;
   a plurality of slots concentrically arranged on the front end of said stuffer cap component, wherein each wire of each of said plurality of conductor pairs may be selectively pressed into a corresponding one of said plurality of slots;

at least one keying member on said stuffer cap component, said at least one keying member having a unique keying member geometry;

a communication connector including a receptacle component having a back end configured for mating with the front end of said stuffer cap component, wherein at least one keying element on said receptacle component is geometrically sized and configured for aligned passage therethrough of a corresponding one of said at least one keying members;

a plurality of insulation displacement contacts (IDCs) on the inner facing surface of said receptacle component being positioned adjacent and concentrically perpendicular to the back end of said receptacle component; and each of said plurality of IDCs being aligned for engaged abutment with a corresponding one of the wires of the plurality of conductor pairs when said stuffer cap component is axially rotated by a user.

2. The system for radially terminating cabling as recited in claim 1 wherein said stuffer cap component includes first and second keying members.

3. The system for radially terminating cabling as recited in claim 2 wherein said receptacle component includes first and second keying elements.

4. The system for radially terminating cabling as recited in claim 1 wherein each of said plurality of IDCs are concentrically curved such that the concave surface of each of said plurality of IDCs is inwardly facing.

5. The system for radially terminating cabling as recited in claim 1 wherein axial rotation of said stuffer cap component causes said at least one keying member and said at least one keying element to become misaligned, thereby locking together said stuffer cap component and said communication connector.

6. The system for radially terminating cabling, said system comprising:

a stuffer cap component having a front end and a rear end, said stuffer cap component surrounding an opening sized and configured for selective passage therethrough of a plurality of conductor pairs of the cabling;

a plurality of slots concentrically arranged on the front end of said stuffer cap component, wherein each wire of each of said plurality of conductor pairs may be selectively pressed into a corresponding one of said plurality of slots;

at least one keying member on said stuffer cap component, said at least one keying member having a unique keying member geometry;

a communication connector including a receptacle component having a back end configured for mating with the front end of said stuffer cap component, wherein at least one keying element on said receptacle component is geometrically sized and configured for aligned passage therethrough of a corresponding one of said at least one keying members;

a plurality of insulation displacement contacts (IDCs) on said receptacle component being positioned adjacent and concentrically perpendicular to the back end of said receptacle component; and each of said plurality of IDCs being aligned for engaged abutment with a corresponding one of the wires of the plurality of conductor pairs when said stuffer cap component is axially rotated by a user.

7. The system for radially terminating cabling as recited in claim 6 wherein said stuffer cap component includes first and second keying members.

8. The system for radially terminating cabling as recited in claim 7 wherein said receptacle component includes first and second keying elements.

9. The system for radially terminating cabling as recited in claim 6 wherein each of said plurality of IDCs are concentrically curved such that the concave surface of each of said plurality of IDCs is inwardly facing.

10. The system for radially terminating cabling as recited in claim 6 wherein axial rotation of said stuffer cap component causes said at least one keying member and said at least one keying element to become misaligned, thereby locking together said stuffer cap component and said communication connector.

11. The system for radially terminating cabling, said system comprising:

a stuffer cap component having a front end surface, said stuffer cap component surrounding an opening sized and configured for selective passage therethrough of a plurality of conductor pairs of the cabling;

a plurality of slots being arranged concentrically perpendicular to the front end surface of said stuffer cap component, wherein each wire of each of said plurality of conductor pairs may be selectively pressed into a corresponding one of said plurality of slots;

at least one stuffer key protrusion on said stuffer cap component, said at least one stuffer key protrusion having a unique keying member geometry;

a communication connector including a receptacle component having a back end surface configured for mating with the front end of said stuffer cap component, wherein at least one IDC surround slot on said receptacle component is geometrically sized and configured for aligned passage therethrough of a corresponding one of said at least one stuffer key protrusions;

a plurality of insulation displacement contacts (IDCs) on said receptacle component being positioned adjacent and concentrically perpendicular to the back end surface of said receptacle component; and each of said plurality of IDCs being aligned for engaged abutment with a corresponding one of the wires of the plurality of conductor pairs when said stuffer cap component is axially rotated by a user.

12. The system for radially terminating cabling as recited in claim 11 wherein said at least one IDC surround slot is L-shaped.

13. The system for radially terminating cabling as recited in claim 11 wherein the distal end of each of said plurality of IDCs is angled inwards toward the center of the communication connector.

14. The system for radially terminating cabling as recited in claim 11 wherein each of said plurality of IDCs are concentrically curved such that the concave surface of each of said plurality of IDCs is inwardly facing.

15. The system for radially terminating cabling as recited in claim 11 wherein axial rotation of said stuffer cap component causes said at least one keying member and said at least one keying element to become misaligned, thereby locking together said stuffer cap component and said communication connector.

\* \* \* \* \*